US009538403B2

(12) United States Patent
Kwong et al.

(10) Patent No.: US 9,538,403 B2
(45) Date of Patent: Jan. 3, 2017

(54) METHODS AND DEVICES RELATING TO DISCONTINUOUS RECEPTION

(71) Applicant: Telefonaktiebolaget L M Ericsson (publ), Stockholm (SE)

(72) Inventors: Waikwok Kwong, Solna (SE); Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 13/985,909

(22) PCT Filed: Jul. 4, 2013

(86) PCT No.: PCT/SE2013/050864
§ 371 (c)(1),
(2) Date: Aug. 16, 2013

(87) PCT Pub. No.: WO2014/042573
PCT Pub. Date: Mar. 20, 2014

(65) Prior Publication Data
US 2014/0078948 A1 Mar. 20, 2014

Related U.S. Application Data

(60) Provisional application No. 61/701,051, filed on Sep. 14, 2012.

(51) Int. Cl.
*H04W 74/06* (2009.01)
*H04W 24/04* (2009.01)
(Continued)

(52) U.S. Cl.
CPC ........... *H04W 24/04* (2013.01); *H04W 76/048* (2013.01); *H04W 74/0866* (2013.01)

(58) Field of Classification Search
None
See application file for complete search history.

(56) References Cited

U.S. PATENT DOCUMENTS

2004/0076137 A1* 4/2004 Seurre ................. H04W 76/048
370/342
2007/0133479 A1* 6/2007 Montojo et al. ............. 370/335
(Continued)

FOREIGN PATENT DOCUMENTS

JP 2011502402 A 1/2011
JP 2011511595 A 4/2011
WO 2009097506 A1 8/2009

OTHER PUBLICATIONS

3rd Generation Partnership Project, "3GPP TS 25.423 V11.2.0 (Jun. 2012)," 3rd Generation Partnership Project; Technical Specification Group Radio Access Network; UTRAN Iur interface Radio Network Subsystem Application; Part (RNSAP) Signalling (Release 11). Jun. 2012, pp. 1-1157.

(Continued)

*Primary Examiner* — Ayaz Sheikh
*Assistant Examiner* — Tarell Hampton
(74) *Attorney, Agent, or Firm* — Murphy, Bilak & Homiller, PLLC

(57) ABSTRACT

Methods and devices relating to Discontinuous reception (DRX) mode are disclosed. In some embodiments a radio network controller detects that a User Equipment operating in a Discontinuous reception mode has performed an uplink transmission on a Random Access Channel, RACH and sends a signal to a Node B that received the uplink transmission indicating to the Node B that the UE has performed said uplink transmission and is continuously monitoring downlink transmissions, where the signal includes information identifying the UE.

23 Claims, 10 Drawing Sheets

(51) Int. Cl.
*H04W 76/04* (2009.01)
*H04W 74/08* (2009.01)

(56) References Cited

U.S. PATENT DOCUMENTS

2009/0109912 A1* 4/2009 DiGirolamo et al. ........ 370/329
2010/0316159 A1* 12/2010 Bo et al. ...................... 375/295

OTHER PUBLICATIONS

3rd Generation Partnership Project, "3GPP TS 25.425 V10.2.0 (Dec. 2011)," 3rd Generation Partnership Project; Technical Specification Group Radio Access Network; UTRAN Iur interface user plane protocols for Common Transport Channel data streams (Release 10). Dec. 2011, pp. 1-49.
3rd Generation Partnership Project, "3GPP TS 25.433 V11.0.0 (Dec. 2011)," 3rd Generation Partnership Project; Technical Specification Group Radio Access Network; UTRAN Iub interface Node B Application Part (NBAP) signalling (Release 11). Dec. 2011, pp. 1-1285.
3rd Generation Partnership Project, "3GPP TS 25.435 V10.4.0 (Dec. 2011)," 3rd Generation Partnership Project; Technical Specification Group Radio Access Network; UTRAN Iub interface user plane protocols for Common Transport Channel data streams (Release 10). Dec. 2011, pp. 1-61.
Author Unknown, "Discussion on fallback to R99 PRACH," Ericsson, ST-Ericsson; 3GPP TSG-RAN2 Meeting #79; R2-123710; Aug. 13-17, 2012. pp. 1-3. QingDao, China.
Author Unknown, "Fallback to RACH R99 and 2nd DRX cycle interaction," Ericsson, ST-Ericsson; 3GPP TSG-RAN2 Meeting #79bis; R2-124996; Oct. 8-12, 2012. pp. 1-3. Bratislava, Slovakia.

* cited by examiner

METHODS AND DEVICES RELATING TO DISCONTINUOUS RECEPTION

TECHNICAL FIELD

The present disclosure discloses methods and devices relating to Discontinuous reception (DRX) of User Equipments (UEs) operating in a cellular radio network.

BACKGROUND

Cellular radio networks are constantly evolving. The third generation partnership project (3GPP) is an organization setting standards for mobile communication. The standards are structured as releases. New functionality is entered into the standard as new releases are launched.

In 3GPP Release 7 and 8, a number of enhancements have been made to improve the performance of the so called CELL_FACH state which is a Radio Resource Control (RRC) State for Random access and short transmissions. The enhancements can be listed as:
  Rel-7: High Speed—Downlink Shared Channel (HS-DSCH) reception in CELL_FACH state
  Rel-8: Enhanced Uplink in CELL_FACH state
  Rel-8: Enhanced User Equipment (UE) Discontinuous Reception (DRX)

The first two enhancements listed above, allow HS-DSCH and Enhanced Dedicated Channel (E-DCH) to be used as the downlink and uplink transport channels, replacing Forward Access Channel (FACH) and Random Access Channel (RACH), respectively. These new transport channels provide much higher bandwidth for UEs in CELL_FACH state.

However, UE supporting these functionalities must use the new transport channels when available. There is no option to fall back to RACH and/or FACH even when, e.g., there is a congestion in those channels. Both the UE and the network must keep on trying until the transmission is successful.

Enhanced UE DRX was introduced to reduce battery consumption. Prior to Rel-8, a UE in the CELL_FACH state is required to monitor Downlink (DL) transmissions continuously. With Enhanced UE DRX, a UE can go into a Discontinuous Reception (DRX) mode after a specified period of uplink and/or downlink inactivity. When operating in this mode, a UE only needs to monitor DL activities for a short duration once every DRX cycle. For the rest of the time, it can turn off its receiver, reducing significantly the amount of power used.

Downlink transmissions must observe the UE's DRX pattern when such a mode is activated. Data can only be sent during the short intervals when the UE is listening to the network. An option for the UE to leave the DRX mode after receiving downlink data is also provided. A prerequisite for Enhanced UE DRX is the use of the HS-DSCH as the downlink transport channel. On the UL, however, either RACH or E-DCH may be used.

The 3GPP TSG RAN meeting #54 has agreed in the Work Item "Further Enhancements to CELL_FACH" to introduce among others the following:
  A second, much longer, DRX cycle.
  The possibility for RRC signaling to fallback to RACH when a request for access on an E-DCH is denied.
  The behavior of a UE operating in DRX mode in CELL_FACH differs depending on whether E-DCH or RACH is configured as the uplink transport channel. When E-DCH is configured, after an uplink transmission, a UE must leave the DRX mode i.e. start to continuously monitor/listen to the High Speed Shared Control CHannel (HS-SCCH) for downlink transmissions for as long as the inactivity timer has not expired. Subsequently the UE may access the HS-DSCH.

However, when RACH is configured as the uplink transport channel, the current 3GPP specifications do not allow the UE to leave the DRX mode. Instead, after an uplink transmission, the UE would turn off the receiver immediately according to the DRX pattern. Transmission of responses on the downlink must wait for occasions when the UE is listening for/monitoring downlink transmissions. If the uplink message is for signaling purpose, e.g., for setting up or the control of time-critical applications, this waiting can introduces large and unnecessary delay.

With the introduction of a much longer DRX cycle (on the order of second.) in Rel-11, the problem becomes much more severe.

With the introduction of Fallback to RACH in Rel-11, the problem spreads even to the case where E-DCH is configured as the uplink transport channel.

There is a constant demand for improving existing systems and to provide more efficient communications in a cellular radio system. Hence, there is a need for methods and apparatuses enabling improved communications in a cellular radio system.

SUMMARY

It is an object of the present invention to provide methods and apparatuses enabling improved communications in a cellular radio system, and in particular for a cellular radio system employing DRX.

This object and others are obtained by the method and apparatus as set out in the appended claims.

Hence, in accordance with some embodiments a method in a radio network controller (RNC) is provided. The method comprises detecting that a User Equipment (UE) operating in a Discontinuous reception (DRX) mode has performed an uplink transmission on a Random Access Channel (RACH). The radio network controller then sends a signal to a Node B that received the uplink transmission indicating to the Node B that the User Equipment has performed the uplink transmission and is continuously monitoring downlink transmissions, where the signal includes information identifying the User Equipment. Hereby, scheduling of downlink transmissions can be facilitated in that the Node B is made aware of when the UE has left a DRX mode.

In accordance with some embodiments the information identifying the UE is a High Speed—Downlink Shared Channel Radio Network Temporary Identifier (H-RNTI) associated with the UE.

In accordance with some embodiments the signal can further include at least one of:
  information indicating when the uplink transmission was performed or when the UE began continuously monitoring downlink transmissions;
  information indicating the earliest instance the UE may return to DRX mode.

In accordance with some embodiments the information indicating when the uplink transmission was performed or when the UE began continuously monitoring downlink transmissions is a Connection Frame Number (CFN) associated with reception of the uplink transmission on the RACH by the Node B.

In accordance with some embodiments the information indicating when the UE may return to DRX mode is provided in the form of a CFN indicating the earliest instance the UE may return to DRX mode.

In accordance with some embodiments the signal is an Iub data frame sent to the Node B. The signal can also be an Iur data frame sent towards the Node B via another radio network controller.

In accordance with other embodiments described herein a method in a Node B is provided. The method comprises receiving a signal from a radio network controller (RNC) indicating that a User Equipment (UE) operating in Discontinuous Reception (DRX) mode has performed an uplink transmission on a Random Access Channel (RACH) and that the UE is continuously monitoring downlink transmissions, where the signal includes information identifying the UE.

In accordance with some embodiments the reception of the signal triggers the Node B to adjust scheduling of downlink transmissions to the UE to account for the indication that the UE is continuously monitoring downlink transmissions. In accordance with some embodiments the scheduling of downlink transmissions to account for the indication comprises scheduling downlink transmissions for the UE earlier than absent said indication.

In accordance with some embodiments the information identifying the UE is a High Speed—Downlink Shared Channel Radio Network Temporary Identifier (H-RNTI) associated with the UE.

In accordance with some embodiments the signal further includes at least one of:
  information indicating when the uplink transmission was performed or when the UE began continuously monitoring downlink transmissions;
  information indicating the earliest instance the UE may return to DRX mode.

In accordance with some embodiments the information indicating when the uplink transmission was performed or when the UE began continuously monitoring downlink transmissions is a Connection Frame Number (CFN) associated with reception of the uplink transmission on the RACH by the Node B.

In accordance with some embodiments the information indicating when the UE may return to DRX mode is provided in the form of a CFN indicating the earliest instance when the UE may return to DRX mode.

In accordance with some embodiments the signal is a data frame received by the Node B. The signal can also be an Iub data frame received by the Node B.

In accordance with some other embodiments a method in a User Equipment (UE) operating in Discontinuous Reception (DRX) mode is provided. The method comprises performing an uplink transmission on a Random Access Channel (RACH); and then starting to continuously monitor downlink transmissions upon performing said uplink transmission.

The disclosure also extends to devices and in particular to a radio base station Node B, to a radio network controller RNC and to a User Equipment for use in a cellular radio system and which are adapted to perform the methods as described herein. The devices can be provided with a controller/controller circuitry for performing the above processes. The controller(s) can be implemented using suitable hardware and or software. The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawings, in which.

DETAILED DESCRIPTION

Figure 1:
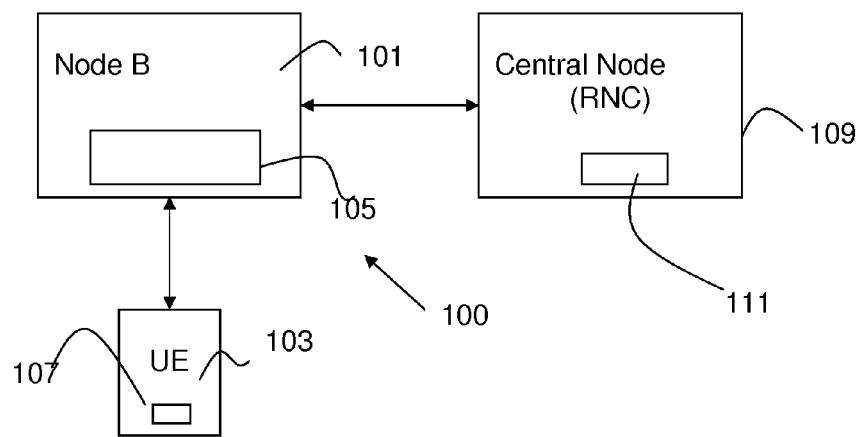
FIG. 1 depicts a general view of a cellular radio system.

In FIG. 1 a general view of a cellular radio system 100 is depicted. The system can for example be a WCDMA/HSPA system. The system 100 comprises a number of radio base stations 101, here denoted NodeBs, whereof only one is shown in the simplified view in FIG. 1. The radio base stations 101 are connected to a control node denoted Radio Network controller (RNC) 109. The system 100 may of course comprise multiple RNCs. The RNC 109 further comprises a module 111 for performing different operations of the RNC 109.

The module 111 can for example be implemented using a network interface circuit for signal interaction with a radio base station 101. The module 111 can further include digital data processing circuitry, operably connected to the network interface circuit.

Mobile stations 103, here represented by a single unit and denoted User Equipment (UE), that are present in a geographical area covered by the radio base station can connect to the radio base station over a radio interface. The radio base station 101 further comprises a module 105 for performing different operations of the radio base station 101. The module 105 can for example be implemented using a microcontroller operating on a set of computer software instructions stored on a memory in the module 105. The UEs 103 in turn comprises a module 107 adapted to perform operations of the UEs 103. The module 107 can for example be implemented using a microcontroller operating on a set of computer software instructions stored on a memory in the module 107. The NodeB supports transmission to and from all the UEs in the area that it covers.

In accordance with some embodiments, after a transmission on RACH, the UE is configured to leave DRX mode and listen continuously for downlink transmissions. Typically the UE can be configured to return to DRX mode after a certain period of continuous monitoring for downlink transmissions. For example, the UE can be set to return to DRX mode after a time defined by an inactivity timer. The data or control message carried by the RACH transmission and received via a Node B (alternatively referred to as a radio base station, RBS) is forwarded by the Node B via an Iub interface to a radio network controller RNC. Optionally the forwarding is performed via both Iub and Iur interfaces. Iub is the interface between the RNC and the Node B and Iur is the interface between RNCs in the same network. To facilitate scheduling of downlink transmissions, the RNC is set to inform the Node B that the UE has left a DRX mode, or the RNC informs the Node B that the UE has performed an uplink transmission on RACH, which implies that the UE has left DRX mode and is now continuously listening/monitoring for downlink transmissions.

Note that, as recognized by the inventors, this is desirable because the Node B has no information on the identity of the senders when messages are transmitted on RACH. The Node B is thus not aware of the fact that particular UE(s) have left DRX mode and is now continuously listening for/monitoring downlink transmissions.

Upon reception of a transmission on RACH, the RNC will understand that the UE that has made the transmission has left DRX mode. The RNC also has knowledge of the UE's DRX pattern and the inactivity timer which specifies the amount of time the UE has to listen for downlink transmissions before going back to DRX mode. According to different embodiments, there are several alternatives for how the RNC is set to inform the Node B of that a certain UE has performed a transmission on RACH and hence is continuously monitoring downlink transmissions:

Solution A: A new Node B Application Part/Radio Network Subsystem Application Part (NBAP/RNSAP) message carrying the information is sent to the Node B. Both NBAP/RNSAP messages which require and which do not require acknowledgements can be used. The information may for example be given as:

The CFN (Connection Frame Number) of the received RACH transmission. Also the identity of the UE, e.g. using the H-RNTI (HS-DSCH Radio Network Temporary Identifier) can be provided.

The earliest CFN that the UE may go back to DRX mode and also the identity of the UE (e.g., the H-RNTI).

Any other quantities that may convey the same information. Examples include, but are not limited to, the usage of System Frame Number (SFN), other kind of timestamps or relative time instead of Connection Frame Number (CFN) and other types of UE identity instead of H-RNTI (e.g. U-RNTI or S-RNTI).

Alternatively an existing NBAP/RNSAP message (for example NBAP: COMMON TRANSPORT CHANNEL RECONFIGURATION REQUEST; RNSAP: COMMON TRANSPORT CHANNEL RESOURCES REQUEST) may be extended to include the above information.

Figure 2:
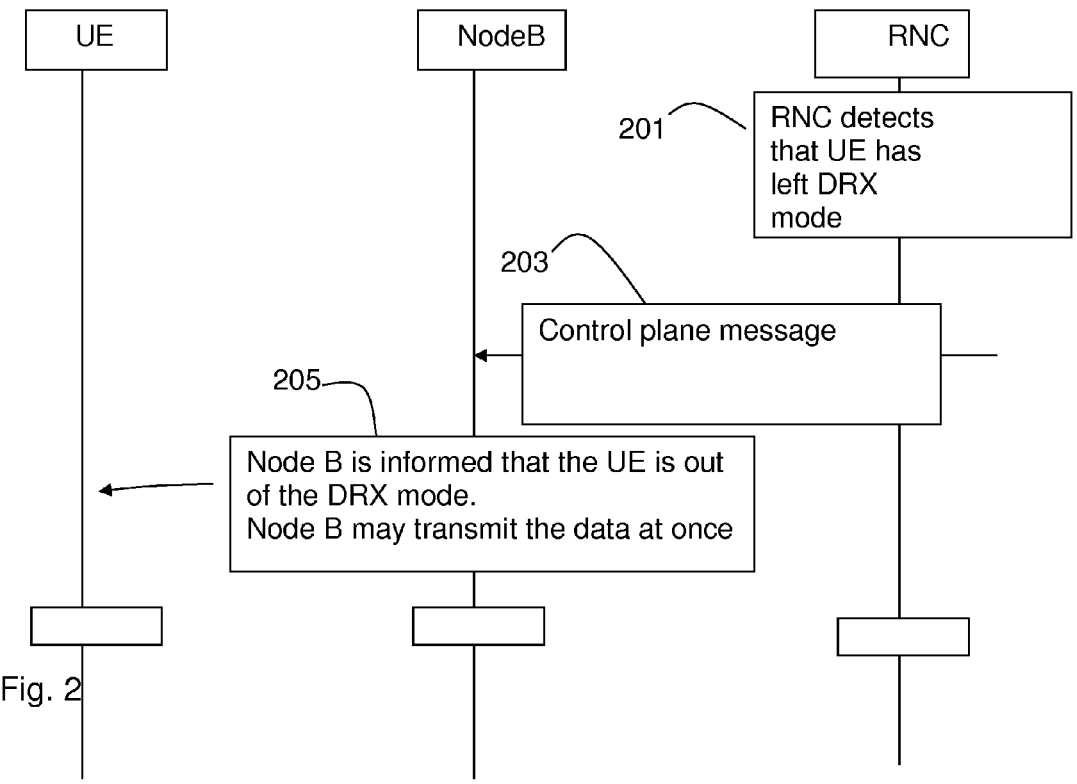
FIG. 2 depicts an RNC informing the NodeB about a UE leaving a DRX mode in accordance with a first embodiment.

In FIG. 2 the above method is depicted. FIG. 2 depicts a method wherein the RNC informs the NodeB about a UE leaving a DRX mode and which UE that is leaving the DRX mode using a control plane message. Thus, first in a step 201, the RNC detects that a UE has left DRX mode. Then, in a step 203, the RNC informs the Node B about the UE that has left DRX mode. This can be performed using a NBAP message using a new or existing control plane message that for example can comprise CFN, UE identify, for example H-RNTI. In accordance with some embodiments he message can be sent by via a Drifting RNC (DRNC) in an RNSAP message. Then, in a step 205, the NodeB is informed that the UE is out of the DRX mode. As a consequence of the message received in step 205, the Node B may start transmission of data to the UE at once.

In accordance with one exemplary embodiment, NBAP "COMMON TRANSPORT CHANNEL RECONFIGURATION REQUEST" is extended. Two new Information Elements (IEs) are introduced as H-RNTI and CFN. This is depicted in Table A below. Below is definition of the NBAP of TS 25.433 (chapter 9.1.6) COMMON TRANSPORT CHANNEL RECONFIGURATION REQUEST. In the example, two new IEs are introduced as H-RNTI and CFN. Other UE identity than H-RNTI, or other timer/data field can be defined, in other positions.

TABLE A

New IEs are introduced in existing NBAP message

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| C-ID | M | | 9.2.1.9 | | YES | reject |
| Configuration Generation ID | M | | 9.2.1.16 | | YES | reject |
| CHOICE Common Physical Channel To Be Configured | M | | | | YES | reject |
| >Secondary CCPCH | | | | | | |
| >>FACH Parameters | | 0 . . . <maxFACHCell> | | | GLOBAL | reject |
| >>>Common Transport Channel ID | M | | 9.2.1.14 | | — | |
| >>>Max FACH Power | O | | DL Power 9.2.1.21 | Maximum allowed power on the FACH. | — | |
| >>>ToAWS | O | | 9.2.1.61 | | — | |
| >>>ToAWE | O | | 9.2.1.60 | | — | |
| >>>TNL QoS | O | | 9.2.1.58A | Shall be ignored if bearer reconfiguration with ALCAP. | YES | ignore |

TABLE A-continued

New IEs are introduced in existing NBAP message

| IE/Group Name | Presence | Range | IE Type and Reference | Semantics Description | Criticality | Assigned Criticality |
|---|---|---|---|---|---|---|
| >>>H-RNTI | O | | 9.2.1.31J | | YES | ignore |
| >>>CFN | O | | 9.2.1.7 | | YES | ignore |
| >>PCH Parameters | | 0 . . . 1 | | | YES | reject |
| >>>Common Transport Channel ID | M | | 9.2.1.14 | — | | |
| >>>PCH Power | O | | DL Power 9.2.1.21 | Power to be used on the PCH. | — | |
| >>>ToAWS | O | | 9.2.1.61 | — | | |
| >>>ToAWE | O | | 9.2.1.60 | — | | |
| >>>TNL QoS | O | | 9.2.1.58A | Shall be ignored if bearer reconfiguration with ALCAP. | YES | ignore |
| >>PICH Parameters | | 0 . . . 1 | | | YES | reject |
| >>>Common Physical Channel ID | M | | 9.2.1.13 | — | | |
| >>>PICH Power | O | | 9.2.1.49A | — | | |
| >>MICH Parameters | | 0 . . . 1 | | | YES | reject |
| >>>Common Physical Channel ID | M | | 9.2.1.13 | — | | |
| >>>MICH Power | O | | PICH Power 9.2.1.49A | — | | |
| >PRACH | | | | | | |
| >>PRACH Parameters | | 0 . . . <maxPRACHCell> | | | GLOBAL | reject |
| >>>Common Physical Channel ID | M | | 9.2.1.13 | — | | |
| >>>Preamble Signatures | O | | 9.2.2.31 | — | | |
| >>>Allowed Slot Format Information | | 0 . . . <maxnoofSlotFormatsPRACH> | | — | | |
| >>>>RACH Slot Format | M | | 9.2.2.37 | — | | |
| >>>RACH Sub Channel Numbers | O | | 9.2.2.38 | — | | |
| >>>TNL QoS | O | | 9.2.1.58A | Shall be ignored if bearer reconfiguration with ALCAP. | YES | ignore |
| >>AICH Parameters | | 0 . . . <maxPRACHCell> | | | GLOBAL | reject |
| >>>Common Physical Channel ID | M | | 9.2.1.13 | — | | |
| >>>AICH Power | O | | 9.2.2.D | — | | |
| >Not Used | | | NULL | This choice shall not be used. Reject procedure if received. | | |

Solution B. A new Iub control frame is used to transfer the information described in Solution A above.

Figure 3:
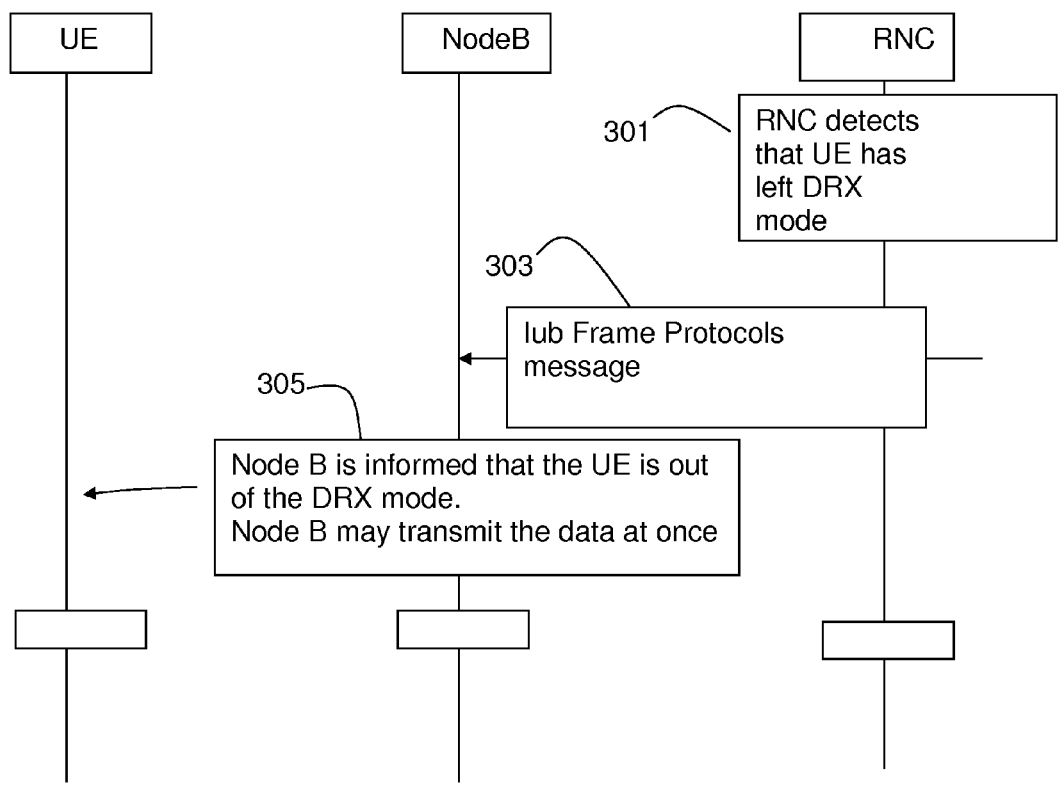
FIG. 3 depicts an RNC informing the NodeB about a UE leaving a DRX mode in accordance with a second embodiment.

This method is illustrated in FIG. 3 where Control Frame Protocol is used to inform the NodeB about a UE having left DRX mode. In FIG. 3 the communication between RNC and NodeB is performed using an indication introduced in a data frame of Iub/Iur User plane message. In the example depicted in FIG. 3, first in a step 301, the RNC detects that a UE has left DRX mode. Then, in a step 303, the RNC informs the Node B about the UE that has left DRX mode. This is performed using an indication in the data frame of Iub/Iur User plane. For example a spare bit/bits in the existing frame or a new frame can be used. Also, the Iur Frame Protocol can be used if the Node B is connected via a DRNC. Then, in a step 305 the NodeB informed that the UE is out of the DRX mode. As a consequence of the message received in step 305, the Node B may start transmission of data to the UE at once.

Figure 4:
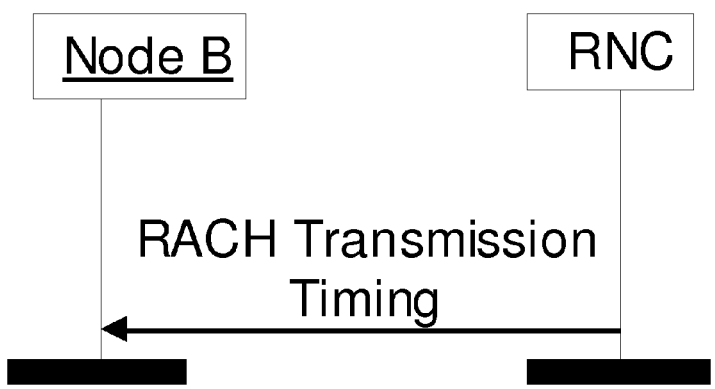
FIG. 4 illustrates transmission of a "RACH Transmission Timing" frame.
Figure 5:
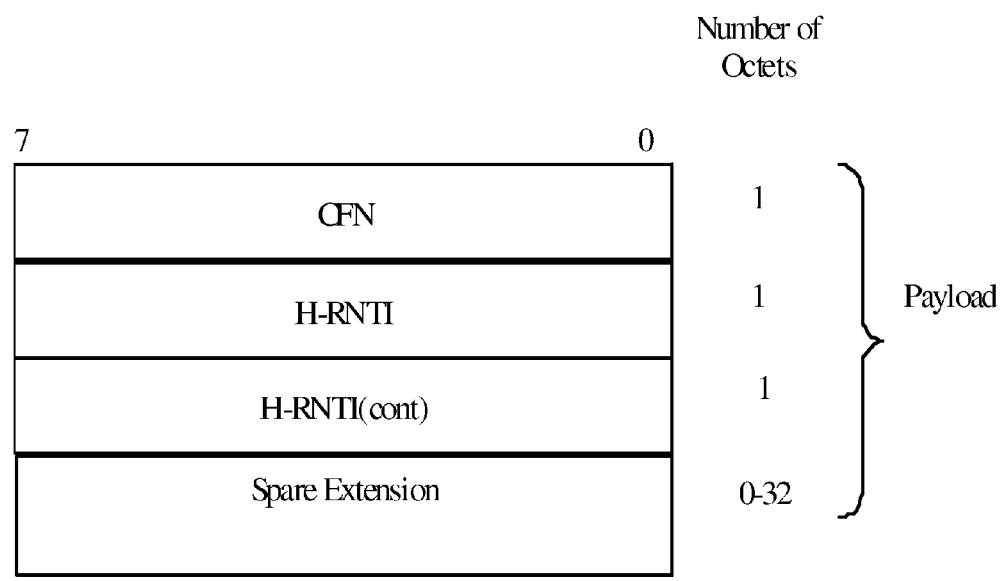
FIG. 5 illustrates an exemplary RACH Transmission Timing payload structure.

In accordance with some embodiments a new control frame is defined as "RACH Transmission Timing" The new control frame can be used instead of the transmission described above in conjunction with FIG. 3 in step 303. The transmission of such a frame is depicted in FIG. 4. The control Frame depicted in FIG. 4 is a new control frame, used when the RNC wants to notify to Node B that the UE had made an up-link (UL) transmission. It is an implementation example of message 303 in FIG. 3. Thus, the message in step 303 of FIG. 3 can either be an extension of an existing message or a new message as depicted in FIG. 4. In FIG. 5 a possible payload structure of the message depicted in FIG. 4 is shown. Thus, FIG. 5 shows an exemplary RACH Transmission Timing payload structure.

Solution C. The downlink Iub frame protocol is extended to carry the information described in Solution A above. This can be implemented using spare bits in the header, spare extensions, or other spare positions. The information is then inserted into a data frame or a control frame and sent to the Node B.

Figure 6:
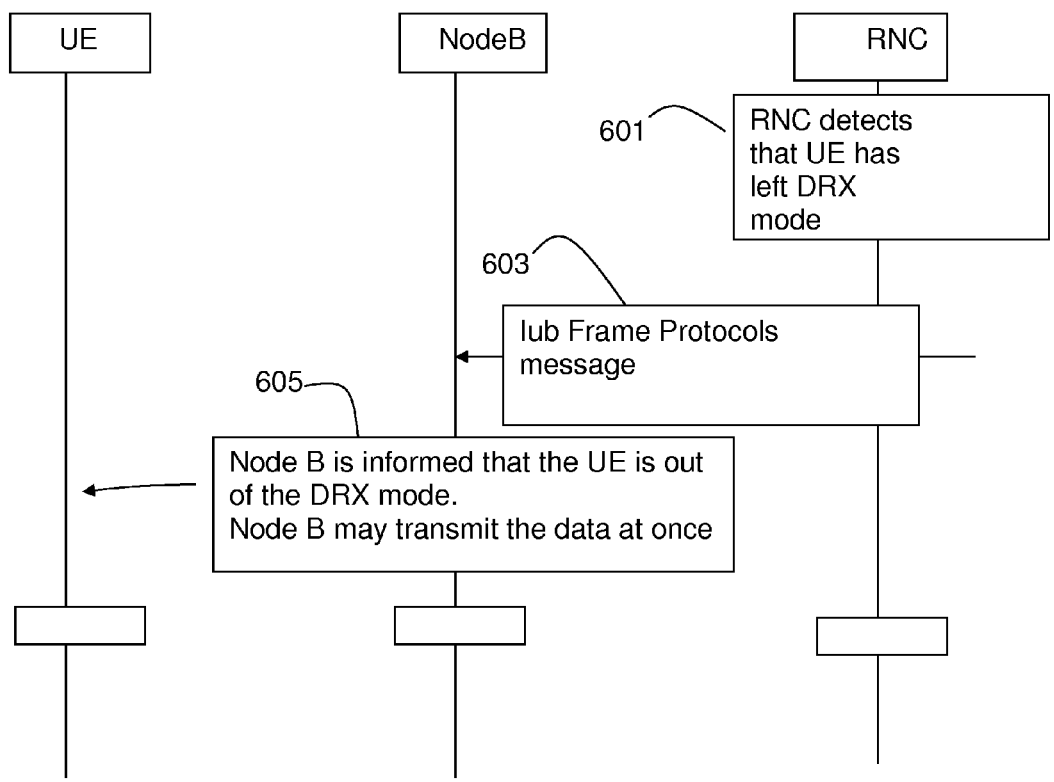
FIG. 6 depicts an RNC informing the NodeB about a UE leaving a DRX mode in accordance with a third embodiment.

An example of such a method is illustrated in FIG. 6. First in a step 601, the RNC detects that a UE has left DRX mode. Then, in a step 603, the RNC informs the Node B about the UE that has left DRX mode. This is performed using spare bits in the header, spare extensions, or other spare positions. The information is then inserted into a data frame or a control frame and sent to the Node B. Then, in a step 605 the NodeB informed that the UE is out of the DRX mode. As a consequence of the message received in step 605, the Node B may start transmission of data to the UE at once.

Figure 7:
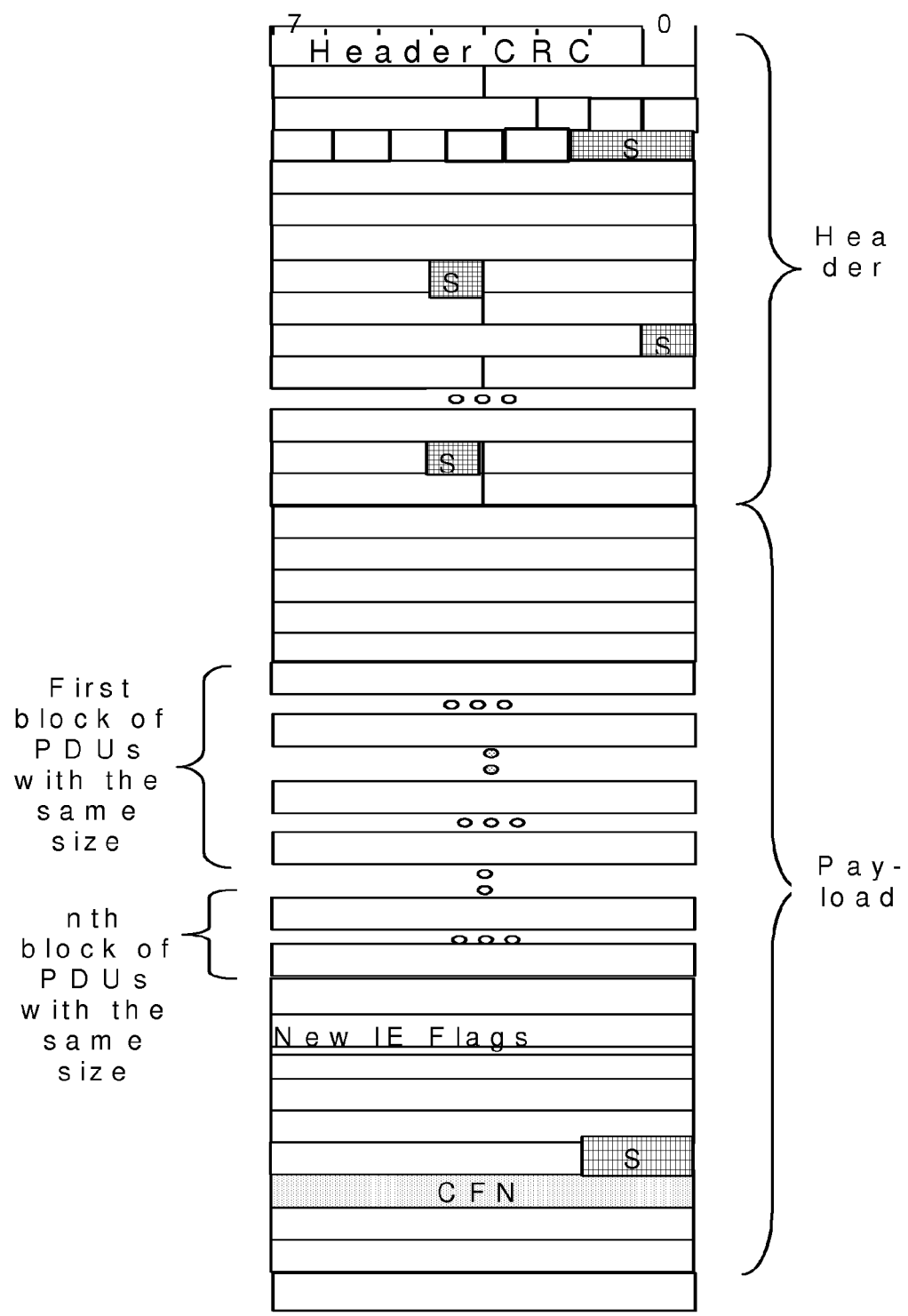
FIG. 7 illustrates a modified HS-DSCH Data Frame.

An exemplary implementation is illustrated in FIG. 7. In FIG. 7 the existing HS-DSCH Data Frame is used. FIG. 7 shows a simplified and modified version of the UP frame of 3GPP TS 25.435 (chapter 6.2.6A) [UP prot]. Instead of introducing an indicator, one Octet from the spare extension (S) is allocated and defines a CFN. RNC uses this CFN to inform Node B to which radio frame the first data shall be transmitted on downlink. A similar approach can apply to HS-DSCH data frame Type 3, and also apply for the data frame in Iur user plane in 25.425.

The New IE flag is defined for the new data field. In the example, the new data field is defined as CFN for 1 octet. It is also possible define the CFN of other range or other data field.

Solution D. The downlink Iub frame protocol may be extended to carry a new flag which indicates if a RACH transmission has just been received from the recipient of the Iub frame. This may be accomplished using a spare bit or bits in the header, spare extensions, or other spare positions. The flag may then be inserted into a data or a control frame and sent to the Node B. The Node B is set to interpret the flag as an indication that a data frame and/or any existing data in the Node B for the same UE may be transmitted to the UE immediately. Alternatively a new control frame including the indicator and the UE identity can be introduced to be sent from RNC to Node B. Alternatively NBAP/RNSAP common channel messages can be extended, or a new message can be introduced to communicate the indictor and the UE identity from RNC to Node B.

Figure 8:
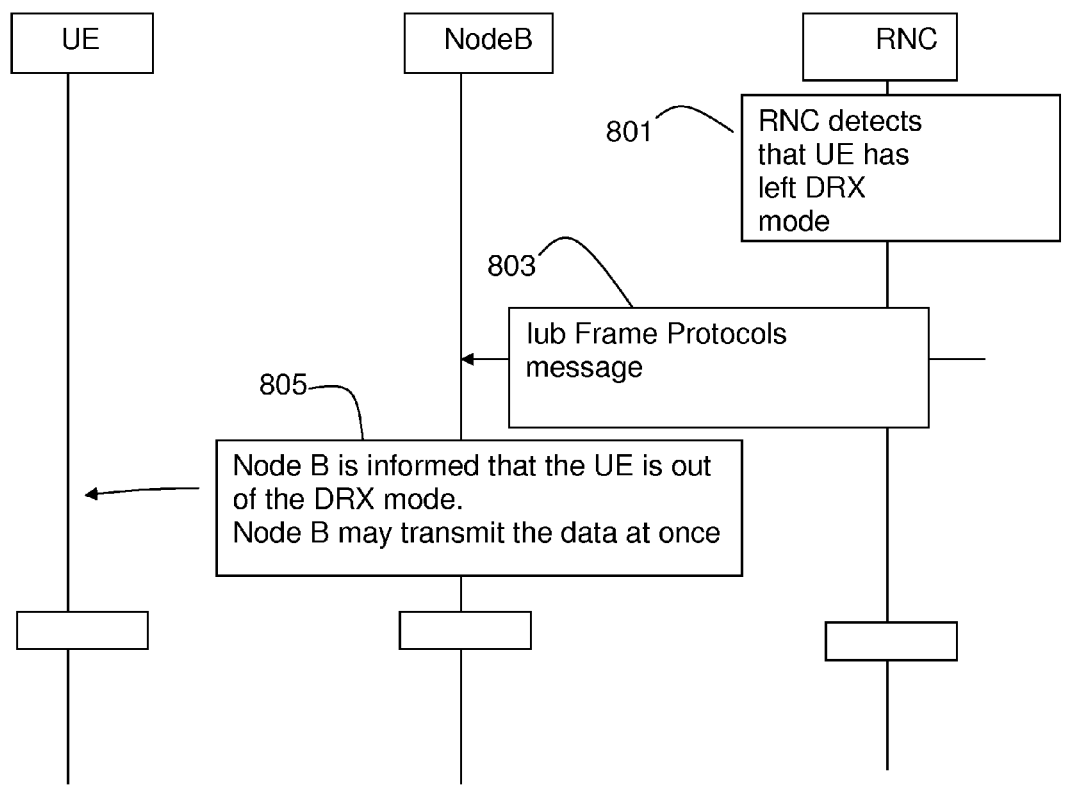
FIG. 8 depicts an RNC informing the NodeB about a UE leaving a DRX mode in accordance with a fourth embodiment.
Figure 9:
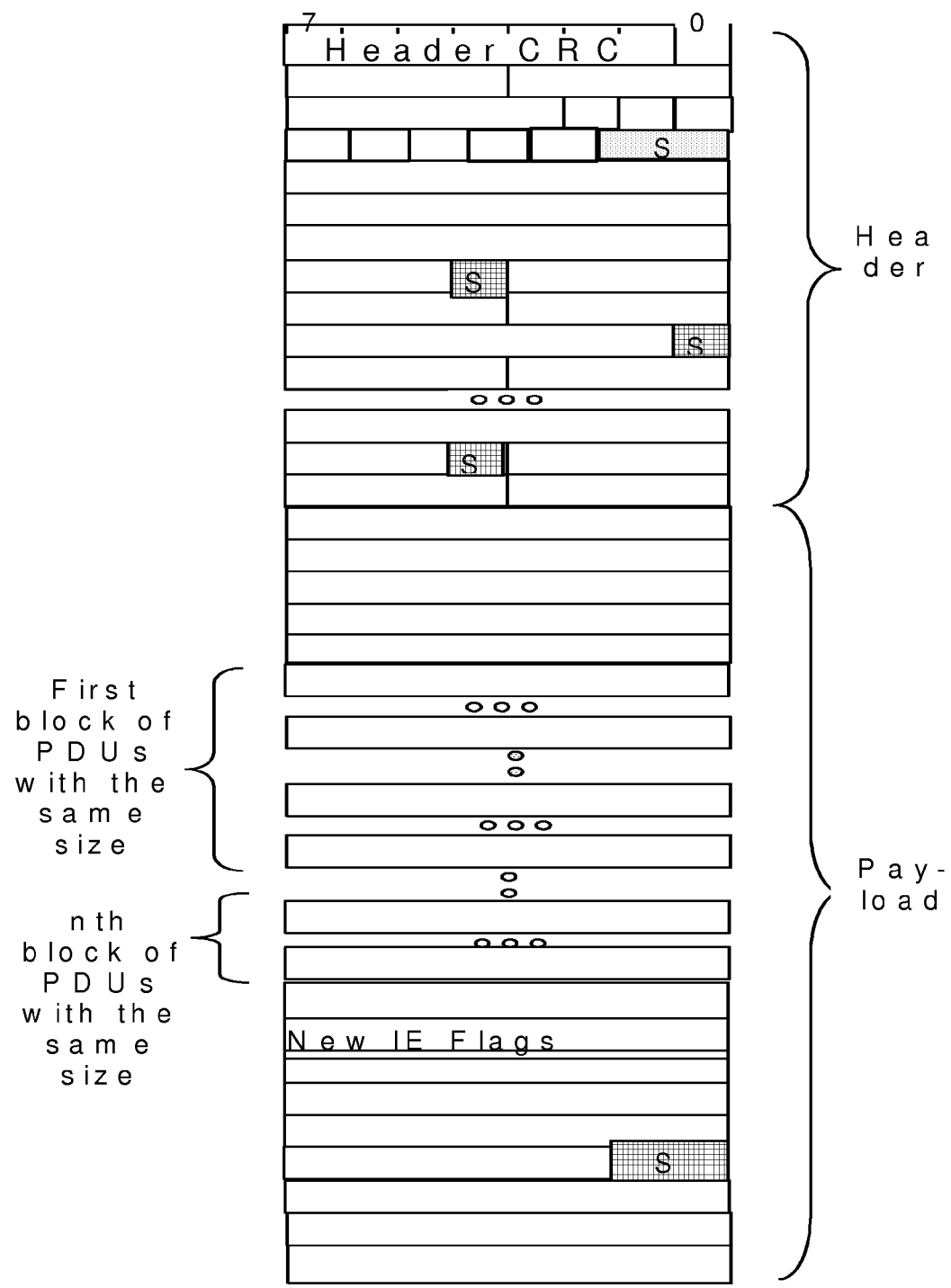
FIG. 9 illustrates a modified HS-DSCH Data Frame.

An example of a solution in accordance with such an approach is illustrated in FIG. 8 and FIG. 9. In FIG. 8 a downlink Iub frame protocol is extended to carry a new flag which indicates if a RACH transmission has just been received from the recipient of the Iub frame. First in a step 801, the RNC detects that a UE has left DRX mode. Then, in a step 803, the RNC informs the Node B about the UE that has left DRX mode. This is performed using spare bits in the header, spare extensions, or other spare positions. The information is then inserted into a data frame or a control frame and sent to the Node B. Then, in a step 805 the NodeB informed that the UE is out of the DRX mode. As a consequence of the message received in step 805, the Node B may start transmission of data to the UE at once.

In FIG. 9 an exemplary implementation is depicted. In FIG. 9 the existing HS-DSCH Data Frame is used. FIG. 9 shows a simplified and modified version of the UP frame of 3GPP TS 25.435 (chapter 6.2.6A) [UP prot]. In the example, the existing HS-DSCH Data Frame is used. In the example, spare bit 2 in the header of HS-DSCH Data Frame Type 2 is allocated for the new flag. The Node B then utilizes this information in the scheduling of exiting and/or subsequent data for the UE.

Figure 10:
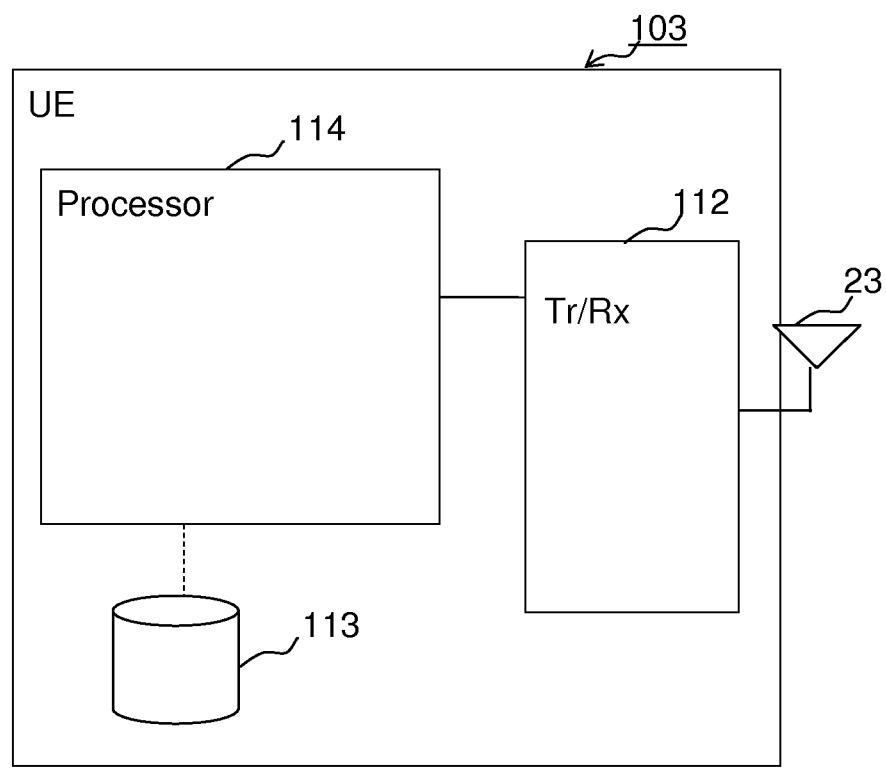
FIG. 10 illustrates a User Equipment implementation.

In FIG. 10 an exemplary User Equipment adapted to follow the above procedures is depicted. As shown in FIG. 10, the example UE 103 includes a controller in the form of a processor 114, a memory 113, a transceiver 112, and an antenna 23. In particular embodiments, some or all of the functionality described above as being provided by a UE or other forms of mobile station may be provided by the processor 114 executing instructions stored on a computer-readable medium, such as the memory 113 shown in FIG. 10. Alternative embodiments of the mobile station may include additional components beyond those shown in FIG. 10 that may be responsible for providing certain aspects of the mobile station's functionality, including any of the functionality described above and/or any functionality necessary to support any of the solutions described above.

Figure 11:
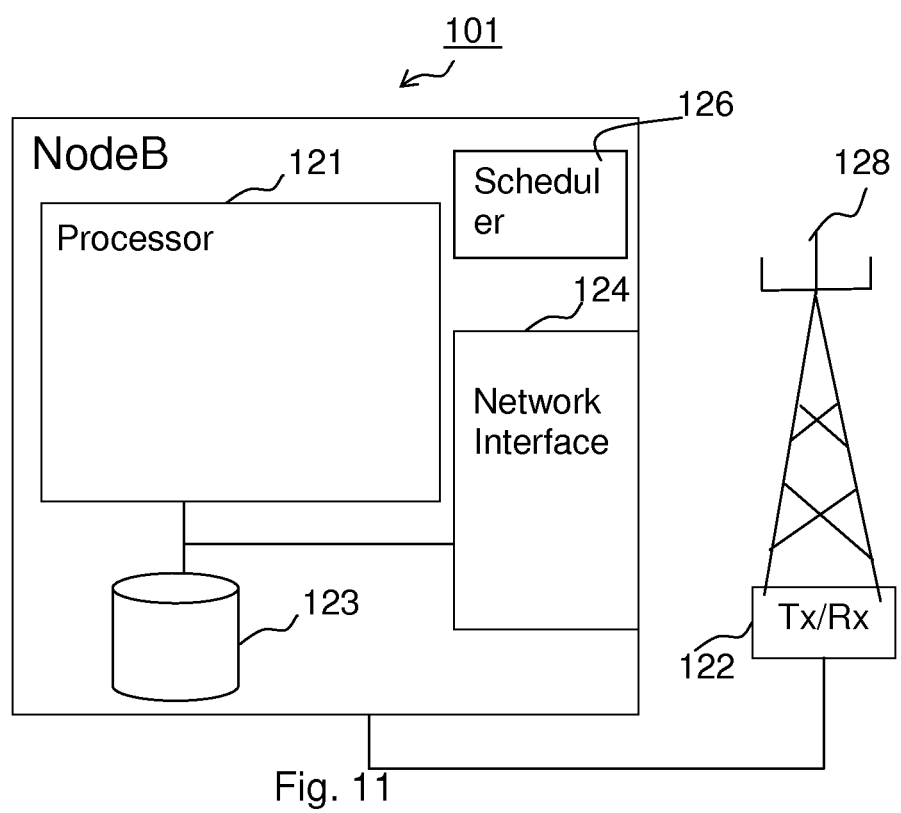
FIG. 11 illustrates a NodeB implementation.

In FIG. 11 an exemplary NodeB 101 is shown. As shown in FIG. 10, the example NodeB 101 includes a controller in the form of a processor 121, a memory 123, a transceiver 122, and an antenna 128. The example NodeB can also comprise a network interface 124. The Node B 101 may further comprise a scheduler 126. The scheduler can either be integrated in the controller or separate from the controller. In particular the scheduler 126 is adapted to schedule downlink transmissions to the UE and to adjust scheduling of downlink transmissions to the UE to account for the indication that the UE is continuously monitoring downlink transmissions.

In particular embodiments, some or all of the functionality described above as being provided by a NodeB, and/or any other type of mobile communications node may be provided by the processor 121 executing instructions stored on a computer-readable medium, such as the memory shown in FIG. 11. Alternative embodiments of the NodeB may include additional components responsible for providing additional functionality, including any of the functionality identified above and/or any functionality necessary to support any of the solutions described above.

Figure 12:
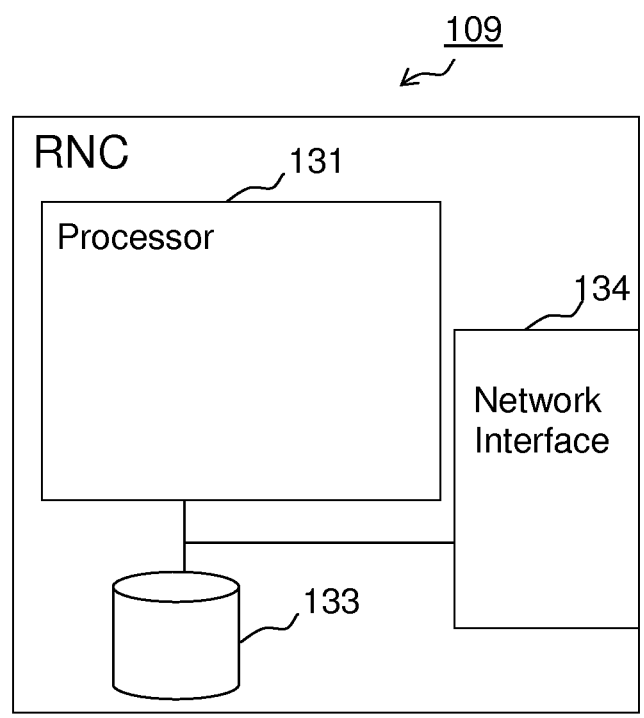
FIG. 12 illustrates the implementation of a central node.

Further, FIG. 12 depicts an exemplary central node 109, such as a RNC. The example central node 109 includes a controller in the form of a processor 131, a memory 133, and a network interface 134 for connection to other nodes of a cellular network such as a NodeB and a Mobile Switching Center. In particular embodiments, some or all of the functionality described above as being provided by a central node, may be provided by the processor 131 executing instructions stored on a computer-readable medium, such as the memory 133. In particular any functionality necessary to support any of the solutions described above.

In summary, NBAP/RNSAP control messages, Iub/Iur control frames and/or data frames may be used by the RNC for indicating to the Node B that a UE has performed an uplink transmission on RACH and is continuously monitoring downlink transmissions. Alternatively, new or modified control messages and control/data frames could also be used. The above examples are given for the NBAP and Iub frame protocols. Similar examples apply to the RNSAP and Iur frame protocols.

Using the methods and devices as described herein can provide quicker responses on the downlink to uplink transmissions on RACH. In addition the call setup time can be reduced.

The invention claimed is:

1. A method in a radio network controller, the method comprising:
   detecting that a User Equipment, UE, operating in a Discontinuous reception, DRX, mode has performed an uplink transmission on a Random Access Channel, RACH; and
   sending a signal to a Node B that received the uplink transmission indicating to the Node B that the UE has performed said uplink transmission and is continuously monitoring downlink transmissions, said signal including information identifying the UE, and information indicating when the uplink transmission was performed or when the UE began continuously monitoring downlink transmissions.

2. The method according to claim 1, wherein the information identifying the UE is a High Speed-Downlink Shared Channel Radio Network Temporary Identifier, H-RNTI, associated with the UE.

3. The method according to claim 1, wherein the information indicating when the uplink transmission was performed or when the UE began continuously monitoring downlink transmissions is a Connection Frame Number, CFN, associated with reception of the uplink transmission on the RACH by the Node B.

4. A method in a Node B, the method comprising:
   receiving a signal from a radio network controller indicating that a User Equipment, UE, operating in Discontinuous Reception, DRX, mode has performed an uplink transmission on a Random Access Channel, RACH, and that the UE is continuously monitoring downlink transmissions, said signal including information identifying the UE
   wherein reception of said signal triggers the Node B to adjust scheduling of downlink transmissions to the UE to account for the indication that the UE is continuously monitoring downlink transmissions.

5. The method according to claim 4, wherein scheduling of downlink transmissions to account for said indication comprises scheduling downlink transmissions for the UE earlier than absent said indication.

6. The method according to claim 4, wherein the information identifying the UE is a High Speed-Downlink Shared Channel Radio Network Temporary Identifier, H-RNTI, associated with the UE.

7. A method in a Node B, the method comprising:
   receiving a signal from a radio network controller indicating that a User Equipment, UE, operating in Discontinuous Reception, DRX, mode has performed an uplink transmission on a Random Access Channel, RACH, and that the UE is continuously monitoring downlink transmissions, said signal including information identifying the UE, and information indicating when the uplink transmission was performed or when the UE began continuously monitoring downlink transmissions.

8. The method according to claim 7, wherein the information indicating when the uplink transmission was performed or when the UE began continuously monitoring downlink transmissions is a Connection Frame Number, CFN, associated with reception of the uplink transmission on the RACH by the Node B.

9. A radio network controller comprising:
   a network interface for receiving and transmitting signals over an Iub and/or Iur interface; and
   a controller operably connected to the network interface;
   said controller adapted to detect that a User Equipment, UE, operating in Discontinuous Reception, DRX, mode has performed an uplink transmission on a Random Access Channel, RACH, and, in response, trigger the network interface to send a signal to the Node B that received the uplink transmission indicating that the UE has performed said uplink transmission and is continuously monitoring downlink transmissions, said signal including information identifying the UE and information indicating when the uplink transmission was performed or when the UE began continuously monitoring downlink transmissions.

10. The radio network controller according to claim 9, wherein the information identifying the UE is a High Speed-Downlink Shared Channel Radio Network Temporary Identifier, H-RNTI, associated with the UE.

11. The radio network controller according to claim 9, wherein the information indicating when the uplink transmission was performed or when the UE began continuously monitoring downlink transmissions is a Connection Frame Number, CFN, associated with reception of the uplink transmission on the RACH by the Node B.

12. The radio network controller according to claim 9, wherein the information indicating when the UE may return to DRX mode is provided in the form of a CFN indicating the earliest instance the UE may return to DRX mode.

13. A Node B comprising:
   a network interface for receiving and transmitting signals over an Iub interface; and
   a controller operably connected to the network interface;
   said controller adapted to receive, via the network interface, a signal from a radio network controller, RNC, indicating that a UE operating in Discontinuous Reception, DRX, mode has performed an uplink transmission on a Random Access Channel, RACH, and is continuously monitoring downlink transmissions, said signal including information identifying the UE; and
   a scheduler integrated in or associated with the controller, and wherein reception of said signal triggers the scheduler to adjust scheduling of downlink transmissions to the UE to account for the indication that the UE is continuously monitoring downlink transmissions.

14. The Node B according to claim 13, wherein the scheduler is integrated as part of the controller.

15. The Node B according to claim 13, wherein the scheduler is separate from the controller.

16. The Node B according to claim 13, wherein the scheduler accounts for said indication by scheduling downlinks transmissions for the UE earlier than it would have done absent said indication.

17. The Node B according to claim 13, wherein the information identifying the UE is a High Speed-Downlink Shared Channel Radio Network Temporary Identifier, H-RNTI, associated with the UE.

18. A Node B comprising:
   a network interface for receiving and transmitting signals over an Iub interface; and
   a controller operably connected to the network interface;
   said controller adapted to receive, via the network interface, a signal from a radio network controller, RNC, indicating that a UE operating in Discontinuous Reception, DRX, mode has performed an uplink transmission on a Random Access Channel, RACH, and is continuously monitoring downlink transmissions, said signal including information identifying the UE and information indicating when the uplink transmission was performed or when the UE began continuously monitoring downlink transmissions.

19. The Node B according to claim 18, wherein the information indicating when the uplink transmission was performed or when the UE began continuously monitoring downlink transmissions is a Connection Frame Number, CFN, associated with reception of the uplink transmission on the RACH by the Node B.

20. A method in a Node B, the method comprising:
receiving a signal from a radio network controller indicating that a User Equipment, UE, operating in Discontinuous Reception, DRX, mode has performed an uplink transmission on a Random Access Channel, RACH, and that the UE is continuously monitoring downlink transmissions, said signal including information identifying the UE,
wherein the signal further includes information indicating the earliest instance the UE may return to DRX mode.

21. A Node B comprising:
a network interface for receiving and transmitting signals over an Iub interface; and
a controller operably connected to the network interface;
said controller adapted to receive, via the network interface, a signal from a radio network controller, RNC, indicating that a UE operating in Discontinuous Reception, DRX, mode has performed an uplink transmission on a Random Access Channel, RACH, and is continuously monitoring downlink transmissions, said signal including information identifying the UE,
wherein the signal further includes information indicating when the uplink transmission was performed or when the UE began continuously monitoring downlink transmissions,
wherein said Node B further comprises a scheduler integrated in or associated with the controller, and wherein reception of said signal triggers the scheduler to adjust scheduling of downlink transmissions to the UE, to account for the indication that the UE is continuously monitoring downlink transmissions.

22. A Node B comprising:
a network interface for receiving and transmitting signals over an Iub interface; and
a controller operably connected to the network interface;
said controller adapted to receive, via the network interface, a signal from a radio network controller, RNC, indicating that a UE operating in Discontinuous Reception, DRX, mode has performed an uplink transmission on a Random Access Channel, RACH, and is continuously monitoring downlink transmissions, said signal including information identifying the UE,
wherein the signal further includes information indicating the earliest instance the UE may return to DRX mode.

23. The Node B according to claim 21, wherein the scheduler accounts for said indication by scheduling downlink transmissions for the UE earlier than it would have done absent said indication.

* * * * *